July 30, 1968 J. F. PETERSEN 3,395,358
DIFFERENTIAL AMPLIFIER APPARATUS
Filed April 28, 1965
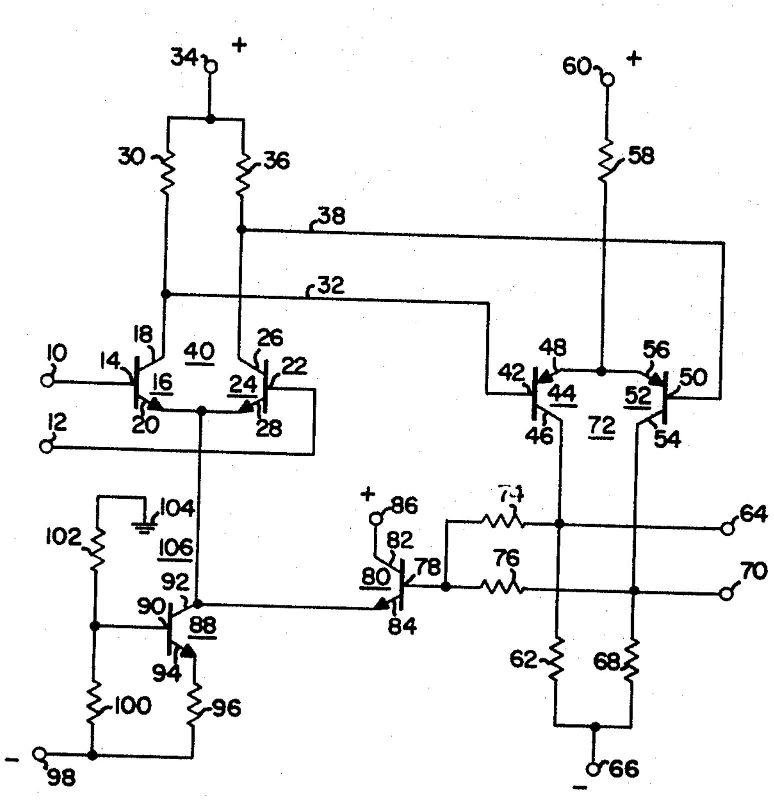
INVENTOR.
JOHN F. PETERSEN
BY Bruce C. Lutz
ATTORNEY

United States Patent Office 3,395,358

Patented July 30, 1968

3,395,358

DIFFERENTIAL AMPLIFIER APPARATUS

John F. Petersen, New Brighton, Minn., assignor to Honeywell Inc., Minneapolis, Minn., a corporation of Delaware Filed Apr. 28, 1965, Ser. No. 451,404
6 Claims. (Cl. 330—30)

ABSTRACT OF THE DISCLOSURE

A differential amplifier with common mode feedback is shown wherein the common mode feedback controls the operating current of the first stage of the amplifier to control the common mode output.

*Background of the invention*

This invention relates generally to amplifying circuitry and more specifically to common mode signal level control in differential amplifiers.

When one output terminal of a differential amplifier goes positive, it is generally desired that the other output terminal go negative by an equal amount. In other words, the signals at the two outputs are symmetrical about a reference or average voltage level usually selected to be ground potential. The error or deviation from symmetry is termed a common mode signal. Two ways that common mode signals may occur are through errors in the circuitry such as power supplies and transistors and by common mode input signals. Various feedback schemes have been used in prior art arrangements to provide common mode control, however, the prior art arrangements have a disadvantage because they usually do not directly regulate the output signal and thus do not compensate for all of the errors in the circuitry. Other prior art arrangements have been such that the individual output signals were limited in voltage swing to a voltage considerably less than the supply voltage. Another limitation of prior art arrangements is that the output signals are not symmetrically clipped. These disadvantages of the prior art amplifiers are generally examplified by a patent to W. T. Matzen, No. 3,046,487.

*Summary of the invention*

This invention overcomes many of the limitations of prior arrangements because it directly regulates the average output voltage, permits maximum swing in the output voltage, and provides for symmetrical clipping of the output wave form. These advantages are accomplished by providing a constant current source that provides both an operating current and a feedback current. Common mode signals present at the output of the amplifier are summed and used to regulate the current conduction of a feedback network. The current in the feedback network comprises a first portion of the constant current and the operating current of the amplifier comprises a second portion of the constant current. Variations in the feedback current cause corresponding variations in the operating current to provide a feedback signal that returns the amplifier to its quiescent operating condition and rejects the common mode signal at the output. The feedback current effectively subtracts from the constant current to provide the operating current so that variations in the feedback current cause opposite variations in the operating current. If the invention is to be used in a multiple stage amplifier, only the first or input stage operating current need be supplied by the constant current source, however, intermediate stages could be regulated as well. The invention is aspecially adapted to regulate those common mode signals that arise through circuitry errors. Basically, the purpose of the invention is to provide a zero output signal when there is zero volts at the input terminals.

Accordingly, it is an object of this invention to regulate the common mode signal level in a differential amplifier.

It is a further object of this invention to provide common mode signal level control in a differential amplifier by directly regulating the output signal.

It is a further object of this invention to regulate common mode signal level in a differential amplifier without limiting the voltage swing of the output signal.

It is a further object of this invention to provide a differential amplifier that exhibits common mode signal control and further exhibits symmertical clipping of the individual output wave forms.

These and further objects of this invention will become apparent to those skilled in the art upon a reading of this specification and appended claims in conjunction with the accompanying drawing.

The single figure is a schematic representation of one embodiment of this invention.

*Detailed description of the invention*

Referring now to the drawing there is shown input means or terminals 10 and 12. Input terminal 10 is connected to the input means, control means, or base means 14 of a current control means, amplifying means, or transistor means 16. Transistor 16 further has an output means or collector means 18 and a common means or emitter means 20. Input terminal 12 is connected to an input means, control means, or base means 22 of a current control means, amplifying means, or transistor means 24. Transistor means 24 further has an output means or collector means 26 and a common means or emitter means 28. Collector means 18 of transistor means 16 is connected to one end of a resistive means 30 and is further connected to a conductor means 32. The other end of resistive means 30 is connected to a source of positive energizing potential 34. Collector means 26 of transistor means 24 is connected to one end of a resistive means 36 and is further connected to a conductor means 38. The other end of resistive means 36 is connected to potential source 34. Transistor means 16 and 24 and their associated circuitry comprise a first stage of difference amplification 40.

Conductor 32 is further connected to an input means, control means, or base means 42 of a current control means, amplifying means, or transistor means 44. Transistor means 44 further has an output means or collector means 46 and a common means or emitter means 48. Conductor means 38 is further connected to an input means, control means, or base means 50 of a current control means, amplifying means, or transistor means 52. Transistor means 52 further has an output means or collector means 54 and a common means or emitter means 56. Emitter means 48 of transistor means 44 and emitter means 56 of transistor means 52 are both connected to one end of resistive means 58. The other end of resistive means 58 is connected to a source of positive energizing potential 60 which may be the same as source 34. Collector means 46 of transistor means 44 is connected to one end of a resistive means 62 and is further connected to an output terminal 64. The other end of resistive means 62 is connected to a source of negative energizing potential 66. Collector means 54 of transistor means 52 is connected to one end of a resistive means 68 and is further connected to an output terminal 70. The other end of resistive means 68 is connected to potential source 66. Transistors 44 and 52 and their associated circuitry comprise a second stage of difference amplification 72.

Collector means 46 of transistor means 44 is further connected by a series combination of resistive means 74 and 76 to collector means 54 of transistor means 52. Resistive means 74 and 76 generally comprise a common mode summing means between the output terminals of the amplifier. Signals developed at the junction between resistive means 74 and 76 are indicative of common mode signals appearing at the output terminals 64 and 70.

The junction between resistive means 74 and 76 is connected to the input means, control means, or base means 78 of a current control means or transistor means 80. Transistor means 80 further has an input means or collector means 82 and an output means or emitter means 84. Collector means 82 is connected to a source of positive energizing potential 86, which may be the same as sources 34 and 60.

There is further shown a current control means or transistor means 88 which has a control means or base means 90, an input means, first output means, or collector means 92, and a second output means or emitter means 94. Collector means 92 of transistor means 88 is connected to emitter means 20 of transistor means 16 and emitter means 28 of transistor means 24 and is further connected to emitter means 84 of transistor means 80. Emitter means 94 of transistor means 88 is connected to a resistive means 96 which is further connected to a source of negative potential 98. Source 98 may be the same as source 66. Base means 90 of transistor means 88 is connected through a resistive means 100 to source 98 and is further connected through a resistive means 102 to a common conductor 104. Transistor means 88 and its associated circuitry comprise a constant current source 106.

While particular polarity transistors have been shown, it is obvious to those skilled in the art that opposite polarity transistors could be used provided that the polarity of the accompanying sources of energizing potential are also reversed. It is also to be understood that while a two-stage differential amplifier has been shown, the invention described herein can be utilized as well in amplifiers other than two-stage differential amplifiers.

To understand the operation of this circuit, first assume that no input signal is applied at input terminals 10 and 12. Current will flow from common conductor 104 through resistors 102 and 100 to source 98. The current flowing through resistor 100 will cause the potential of base 90 of transistor 88 to be higher than the potential of emitter 94 and transistor 88 will be biased in a conducting state. Because the current through resistor 100 is substantially constant, the current flowing from collector 92 to emitter 94 of transistor 88 will be substantially constant. A quiescent operating current will flow in the first stage of amplification 40 from source 34 through resistor 30, through collector 18 to emitter 20 of transistor 16, to collector 92 of transistor 88 and from source 34 through resistor 36, through collector 26 to emitter 28 of transistor 24, to collector 92 of transistor 88. This quiescent operating current will establish a first portion of the constant current flowing through transistor 88. The bias current in the first stage of amplification 40 will establish a reference potential at collector 18 of transistor 16 and at collector 26 of transistor 24. The potential on collector 18 will be coupled by conductor 32 to base 42 of transistor 44 and the potential of collector 26 will be coupled by conductor 38 to base 50 of transistor 52. In the second stage of amplification 72 a quiescent operating current will flow from source 60 through resistor 58 from emitter 48 to collector 46 of transistor 44, and through resistor 62 to source 66. A second quiescent operating current will flow from source 60 through resistor 58, from emitter 56 to collector 54 of transistor 52, and through resistor 68 to source 66. The operating currents flowing through the second stage of amplification 72 should establish potentials at output terminals 64 and 70 that are at or near ground potential. A second portion of the constant current flowing through transistor 88 will be supplied by a current flowing from source 86, through collector 82 to emitter 84 of transistor 80, and to collector 92 of transistor 88.

If the current flowing through transistor 80 increases, the operating current of the first stage of amplification 40 must correspondingly decrease to maintain the constant current through transistor 88. The operating current flowing through the first stage of amplification 40 and the feedback current flowing through transistor 80 may be thought of as adding to provide a constant current. Alternatively, the feedback current flowing through transistor 80 may be thought of as subtracting from a total available constant current to regulate the remaining current for use as the operating current for the first stage of amplification 40.

Common mode signals at the output terminals 64 and 70 are summed by resistors 74 and 76 to bias the base 78 of transistor 80 and thereby cause variations in the feedback current flowing through transistor 80. If both of terminals 64 and 70 go positive at the same time, this positive common mode signal will be summed by resistors 74 and 76 to provide a positive going signal at the base 78 of transistor 80. This positive going signal will cause an increase in conduction of transistor 80. An increase in conduction of transistor 80 will cause a decrease in the operating currents of the first stage of amplification 40. A decrease in the operating currents in the first stage of amplification 40 will cause a rise in potential on conductors 32 and 38. The rise in potential on conductors 32 and 38 will tend to decrease conduction of transistors 44 and 52 thereby providing a feedback which will tend to decrease the potentials of collectors 46 of transistor 44 and collector 54 of transistor 52. This feedback action tends to control, eliminate, reject, or decrease the amplitude of the positive common mode signals at the output terminals 64 and 70.

The operation of the feedback to reject negative going common mode signals is substantially the same as was explained above for positive going common mode signals except that where positive going common mode signals caused an increase in conduction, negative going common mode signals cause a decrease in conduction.

When differential input signals are applied to terminals 10 and 12, the changes in conduction in each stage are substantially equal and opposite and cancel each other out. For example, if terminal 10 becomes positive and terminal 12 becomes negative, the conduction of transistor 16 will be increased and the conduction of transistor 24 will be decreased by substantially the same amount thereby keeping the total bias current of the first stage 40 essentially constant. A differential signal will be applied to base 42 of transistor 44 and base 50 of transistor 52 to increase the conduction of transistor 44 and decrease the conduction of transistor 52. The change in conduction is again equal and opposite thereby keeping the total bias current substantially constant. Output terminal 64 will go positive and output terminal 70 will go negative by substantially equal amounts. When the differential signal is summed in resistors 74 and 76, the potential of the junction between resistors 74 and 76 will remain near ground and will not cause a change in the conduction of transistor 80.

A second feature of this invention is symmetrical clipping of the output wave form. Referring to the second stage of amplification 72, assume that base 50 of transistor 52 is being driven negative and that base 42 of transistor 44 is being driven positive. If the signal applied to base 50 of transistor 52 becomes large enough, transistor 52 will be driven into saturation. Almost all of the operating current for the second stage of amplification 72 will flow from emitter 56 to collector 54 of transistor 52 and very little bias current will flow from emitter 48 to collector 46 of transistor 44. Now assume that source 60 is a positive 12 volts and that source 66 is a negative 12 volts. In this saturated condition output terminal 70 will be at approximately +9 volts and output terminal 64 will be at approximately −12 volts. Current will then flow from collector 54 of transistor 52 through resistors 76 and 74 to collector 46 of transistor 44. The voltage developed at base 78 of transistor 80 will be approximately −1.5 volts, which is sufficient to start turning transistor 80 to a non-conducting condition. With transistor 80 becoming non-conductive, a larger operating current will be provided to the first stage of amplification 40. The larger operating current flowing through the first stage of amplification 40 will lower the potential of both conductors 32 and 38. Because transistor 52 is already saturated, lowering the potential of its base will not have any appreciable effect. However, the potential decrease on conductor 32 is coupled to the base 42 of transistor 44 which will increase the conduction of transistor 44. The conduction of transistor 44 will increase until its collector 46 is at a −9 volts so that the output is clipped symmetrically.

The particular embodiment of this invention shown and described is preferred because it can easily be integrated onto a single semiconductor chip. However, those skilled in the art will realize that this invention can be practiced by amplifiers other than the specific embodiment shown and described and whether or not they are integrated on a single semiconductor chip. Accordingly, it is my intention to be limited only by the scope of the appended claims.

I claim as my invention:

1. A common mode control difference amplifier comprising, in combination:
first and second transistor means each having a base means, a collector means, and an emitter means;
means for supplying an input signal connected to said base means of said first and second transistor means;
first, second, third, fourth, and fifth means for supplying energizing potential;
means connecting said collector means of said first and second transistor means to said first means for supplying energizing potential;
third and fourth transistor means each having a base means, a collector means, and an emitter means;
means connecting said base means of said third transistor means to said collector means of said first transistor means and said base means of said fourth transistor means to said collector means of said second transistor means;
means connecting said collector means of said third and fourth transistor means to said second means for supplying energizing potential;
means connecting said emitter means of said third and fourth transistor means to said third means for supplying energizing potential;
fifth transistor means having a base means, a collector means, and an emitter means;
first resistive means connected between said base means of said fifth transistor means and a common conductor;
second and third resistive means connected between said base means and said emitter means, respectively, of said fifth transistor means and said fourth means for supplying energizing potential whereby a substantially constant current is constrained to flow from said collector means to said emitter means of said fifth transistor means;
means connecting said collector means of said fifth transistor means to said emitter means of said first and second transistor means whereby a first portion of said constant current flowing through said fifth transistor means flows from said emitter means of said first and second transistor means;
sixth transistor means having a base means, a collector means, and an emitter means;
means connecting said collector means of said sixth transistor means to said fifth means for supplying energizing potential;

means connecting said emitter means of said sixth transistor means to said collector means of said fifth transistor means whereby the second portion of said constant current flowing through said fifth transistor means also flows through said sixth transistor means;
fourth resistive means connected between said collector means of said third transistor means and said base means of said sixth transistor means; and
fifth resistive means connected between said collector means of said fourth transistor means and said base means of said sixth transistor means whereby said fourth and fifth resistive means comprise a common mode summation circuit and provide a signal at said base means of said sixth transistor means indicative of common mode signals at said collector means of said third and fourth transistor means, said signal at said base means of said sixth transistor means operating to vary the conduction of said sixth transistor means and thereby vary said first and second portions of said constant current flowing through said fifth transistor means, the variation of said first portion of said constant current operating to vary the conduction of said third and fourth transistor means and control said common mode signals.

2. Amplifying apparatus comprising, in combination:
first, second, third, and fourth transistor means each having input, output, and common means;
means connecting said first and second transistor means to provide a first stage of differential amplification;
means connecting said third and fourth transistor means to provide a second stage of differential amplification;
means for supplying an input signal to said input means of said first and second transistor means;
means connecting said output means of said first and second transistor means to said input means of said third and fourth transistor means, respectively;
resistive means connected between said output means of said third and fourth transistor means, said resistive means providing an output signal indicative of common mode signals present at said output means of said third and fourth transistor means;
fifth transistor means connected to provide a constant current source having a constant current flowing therethrough;
means connecting said common means of said first and second transistor means to said fifth transistor means so that a current flowing through said first and second transistor means provides a first portion of said constant current;
sixth transistor means having a control means, said sixth transistor means being connected to provide a second portion of said constant current;
means connecting said output signal from said resistive means to said control means of said sixth transistor means whereby said common mode signals operate to cause variations in said first and second portions of said constant current, the variation in said first portion of said constant current operating to control said common mode signals.

3. Amplifying apparatus comprising, in combination:
amplifying means having first and second stages of difference amplification and further having input and output means;
a constant current source for supplying a substantially constant current;
means connecting said constant current source to said first stage of difference amplification whereby the quiescent operating current of said first stage of difference amplification comprises a first portion of said constant current;
summing means connected across said output means, said summing means providing a signal indicative of common mode signals present at said output means;

transistor means having input, output, and control means;

means connecting said control means to receive said signal from said summing means whereby said signal from said summing means is operable to control the current flowing from said input means to said output means of said transistor means;

means connecting said input means of said transistor means to a source of energizing potential; and means connecting said output means of said transistor means to said constant current source whereby said current flowing through said transistor means comprises a second portion of said constant current whereby said signal from said summing means is operable to cause variations in the conduction of said transistor means and opposite variations in said operating current of said first stage difference amplification thereby reducing the amplitude of said common mode signals at said output means.

4. Apparatus of the class described comprising, in combination:

differential amplifier means having input and output means and further having an input stage of amplification;

means for supplying an input signal connected to said input means;

means for supplying a substantially constant current connected to said amplifier means whereby a quiescent current through said input stage of amplification is supplied by said means for supplying a constant current;

summing means connected across said output means whereby output signals are summed in said summing means to provide common mode feedback signals;

current control means connected to said summing means whereby said feedback signals cause variations in the conduction of said current control means, said current control means providing a feedback current; and means connecting said current control means to said means for supplying a constant current whereby said feedback current and said quiescent current sum to provide said constant current so that variations in said feedback current cause opposite variations in said quiescent current, said variations in said quiescent current being operable to reduce the amplitude of said common mode signals.

5. Apparatus for common mode control in an amplifier having differential input and output means comprising, in combination:

first transistor means connected to supply a substantially constant current;

first and second resistive means connected serially across said differential output means, said first and second resistive means comprising a summing means for providing a common mode error signal at a junction point between said first and second resistive means;

second transistor means connected between a source of energizing potential and said first transistor means whereby a first portion of said constant current flows through said second transistor means;

means connecting said first transistor means to said amplifier whereby a second portion of said constant current provides a quiescent operating current for said amplifier; and means connecting said second transistor to said summing means whereby said common mode error signal controls said first portion of constant current thereby controlling said quiescent operating current to control said common mode error signal.

6. Apparatus of the class described comprising, in combination:

amplifier means having first and second output means, said amplifier further having bias means for providing an operating current such that variations in said operating current cause variations in common mode signals at said first and second output means;

means for supplying a substantially constant current connected to said amplifier means, a first portion of said constant current supplying said bias current;

means connected to said first and second output means for providing an error signal indicative of common mode signals at said first and second output means;

feedback means connected to receive said error signal, said feedback means providing a feedback current; and means connecting said feedback means to said means for supplying a constant current so that a second portion of said constant current comprises said feedback current whereby said error signal operates to cause opposite variations in said feedback current and said operating current so that said common mode signals are controlled.

References Cited

UNITED STATES PATENTS 3,046,487 7/1962 Matzen et al. ------ 330—30 XR

ALFRED L. BRODY, *Primary Examiner.*

N. KAUFMAN, *Assistant Examiner.*